(12) United States Patent
Danielowski et al.

(10) Patent No.: US 9,534,566 B2
(45) Date of Patent: Jan. 3, 2017

(54) FUEL VAPOR STORAGE AND RECOVERY APPARATUS

(71) Applicant: Kautex Textron GmbH & Co. KG, Bonn (DE)

(72) Inventors: Karsten Danielowski, Troisdorf (DE); Bjoern Stell, Bergisch Gladbach (DE); Tho Truong Huynh, Southhampton (GB); Piers Catton, Gosports (GB)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/417,377

(22) PCT Filed: Jul. 8, 2013

(86) PCT No.: PCT/EP2013/064340
§ 371 (c)(1),
(2) Date: Jan. 26, 2015

(87) PCT Pub. No.: WO2014/016102
PCT Pub. Date: Jan. 30, 2014

(65) Prior Publication Data
US 2015/0176540 A1    Jun. 25, 2015

(30) Foreign Application Priority Data
Jul. 26, 2012   (EP) ................................... 12005445

(51) Int. Cl.
*F02M 25/08*   (2006.01)
*F02D 41/00*   (2006.01)
*B60K 15/035*  (2006.01)

(52) U.S. Cl.
CPC ...... *F02M 25/089* (2013.01); *B60K 15/03504* (2013.01); *F02D 41/003* (2013.01);
(Continued)

(58) Field of Classification Search
CPC   F02M 25/08; F02M 25/0818; F02M 25/0836; F02M 25/0854; F02M 25/0872; F02M 25/089; F02D 41/003; F02D 41/0032; F02D 41/0037; F02D 41/004; F02D 41/0042; F02D 41/0045
(Continued)

(56) References Cited

U.S. PATENT DOCUMENTS 4,203,401 A * 5/1980 Kingsley ............ F02M 25/0854
123/520
6,955,159 B2 * 10/2005 Ogawa ............... F02M 25/0854
123/519

(Continued)

FOREIGN PATENT DOCUMENTS

EP    1507081 A1    2/2005

OTHER PUBLICATIONS

English language PCT International Search Report mailed Sep. 3, 2013, received in corresponding PCT Application No. PCT/EP13/64340, 2 pgs.

(Continued)

*Primary Examiner* — Mahmoud Gimie
(74) *Attorney, Agent, or Firm* — Grossman Tucker Perreault & Pfleger, PLLC

(57) ABSTRACT

The invention refers to a fuel vapor storage and recovery apparatus (1) comprising at least one main vapor storage compartment (3) filled with an adsorbent material, at least one vapor inlet port (7), at least one atmospheric vent port (8) and at least one purge port (9), said vapor inlet port (7) being connectable to a fuel tank venting line and said purge port (9) being connectable to an engine air intake line, wherein said main vapor storage compartment (3) comprises a purge buffer zone (14) as well as first and second fuel vapor distribution chambers (10, 24) not filled with an
(Continued)

Figure 1:
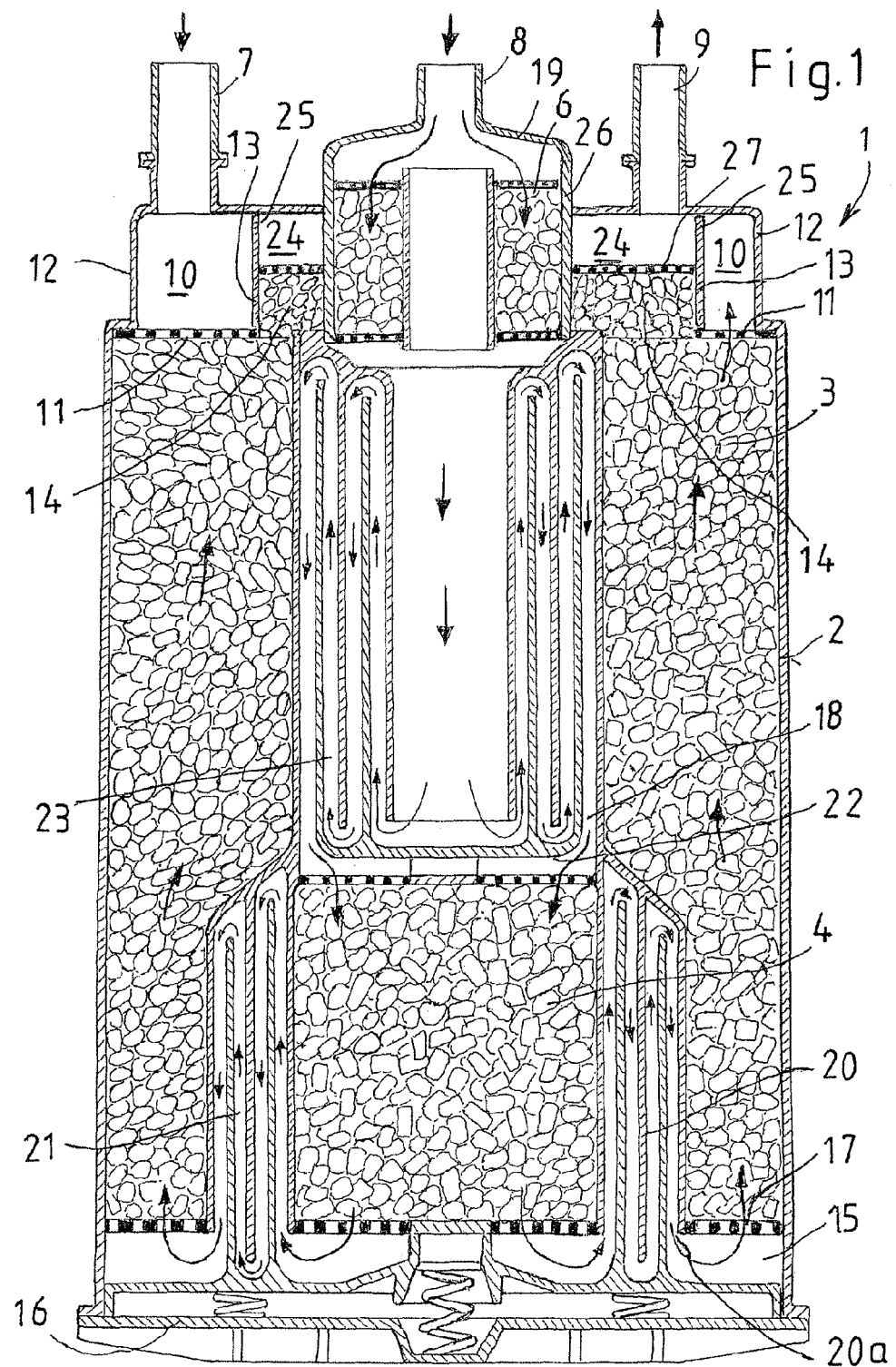

adsorbent material. Said first fuel vapor distribution chamber is arranged upstream said purge buffer zone (14) and communicates with said fuel vapor inlet port (7). Said second fuel vapor distribution chamber (24) is arranged downstream said purge buffer zone and communicates with said purge port (9).

10 Claims, 2 Drawing Sheets

(52) U.S. Cl.
 CPC ......... *F02D 41/0032* (2013.01); *F02M 25/08* (2013.01); *F02M 25/0818* (2013.01); *F02M 25/0836* (2013.01); *F02M 25/0854* (2013.01); *F02M 25/0872* (2013.01); *B60K 2015/03514* (2013.01)

(58) Field of Classification Search
 USPC ............. 123/519, 518, 516, 520, 698, 198 D
 See application file for complete search history.

(56) References Cited

U.S. PATENT DOCUMENTS

| | | | |
|---|---|---|---|
| 7,047,952 B1 | 5/2006 | Yamauchi et al. | |
| 7,097,697 B2* | 8/2006 | Nakamura | B01D 53/0431 123/519 |
| 7,922,797 B2* | 4/2011 | Kosugi | B01D 53/0415 123/519 |
| 2006/0102156 A1* | 5/2006 | Yamauchi | B01D 53/0415 123/519 |
| 2009/0139495 A1 | 6/2009 | Crawford | |
| 2009/0320806 A1* | 12/2009 | Lang | B01D 53/0407 123/519 |
| 2011/0197861 A1 | 8/2011 | Sugiura | |
| 2012/0186563 A1* | 7/2012 | Hasegawa | B01D 53/0415 123/519 |

OTHER PUBLICATIONS

English language PCT Written Opinion mailed Sep. 3, 2013, received in corresponding PCT Application No. PCT/EP13/64340, 6 pgs.

\* cited by examiner

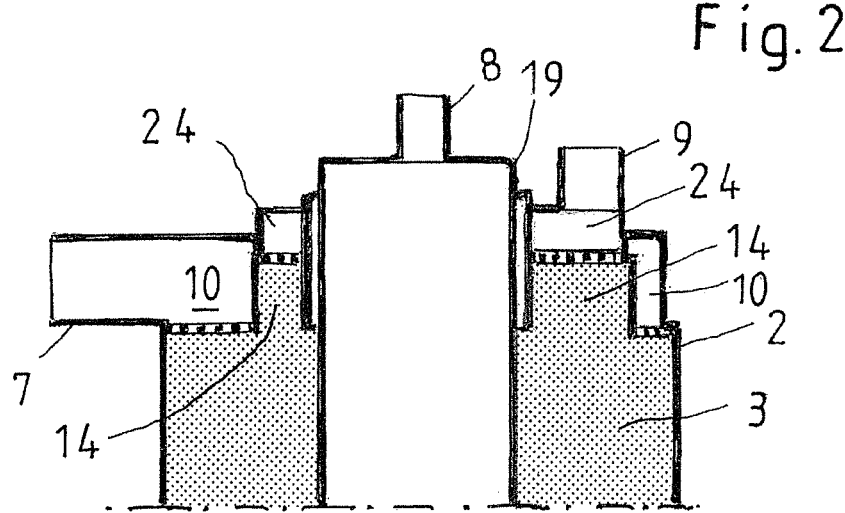
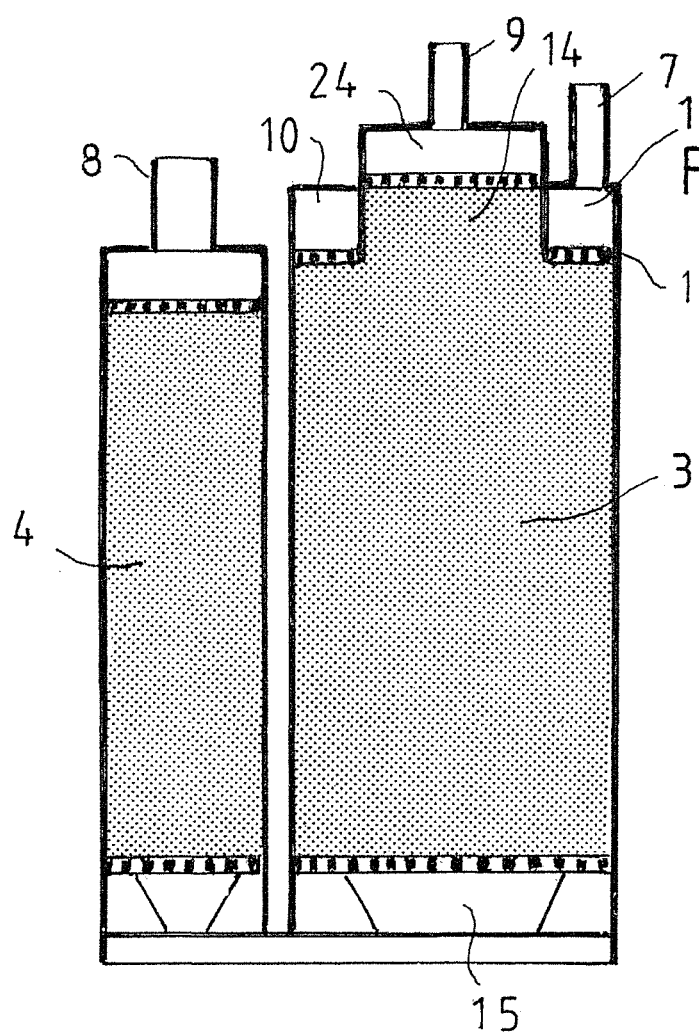

FUEL VAPOR STORAGE AND RECOVERY APPARATUS

The invention refers to a fuel vapor storage and recovery apparatus comprising at least one main vapor storage compartment filled with an adsorbent material, at least one vapor inlet port, at least one atmospheric vent port and at least one purge port, said vapor inlet port being connectable to a fuel tank venting line and said purge port being connectable to an engine air intake line, wherein said main vapor storage compartment comprises a purge buffer zone.

Fuel vapor storage and recovery apparatuses of the above-referred kind are generally known in the art, and are sometimes referred to as so-called carbon canisters. The gasoline fuel used in many internal combustion engines is quite volatile. Evaporative emissions of fuel vapor from a vehicle having an internal combustion engine occur principally due to venting of fuel tanks of the vehicle. When the vehicle is parked, changes in temperature or pressure cause air laden with hydrocarbons to escape from the fuel tank. Some of the fuel inevitably evaporates into the air within the tank and thus takes the form of vapor. If the air emitted from the fuel tank, where allowed to flow untreated into the atmosphere, it would inevitably carry with it this fuel vapor.

In order to prevent fuel vapor loss into the atmosphere, the fuel tank of a car is vented through a conduite to a canister containing suitable fuel adsorbent materials such as activated carbon. High-surface area granular activated carbon material are widely used and temporarily adsorb the fuel vapor.

As carbon canisters/fuel vapor storage and recovery apparatuses have a limited adsorption capacity, carbon canisters normally have to be regenerated now and then. Regeneration is normally achieved via purging from the engine manifold, i.e. an engine air intake line draws atmospheric air backwards through the carbon canister, so that hydrocarbons are delivered to the engine for burning-off with the engine intake air.

Normally, in the very beginning of the purging operation, carbohydro-laden air is drawn via the fuel tank vent line through the carbon canister into the engine air intake line. As soon as the suction in the purge line/engine air intake line fully builds up, ambient air is drawn through the atmospheric vent port from the upstream end of the carbon canister towards its downstream end, i.e. from end to end, thus, regenerating the carbon bed.

In order to prevent direct purging of hydrocarbons from the fuel tank directly into the engine air intake line and thereby partially bypassing the adsorbent material within the carbon canister, it is generally known to provide a so-called purge buffer within the carbon canister. Typically, such purge buffers eliminate hydrocarbon peaks within the engine air intake stream, which occasionally causes difficulties in controlling the exhaust emission. More specifically, purge buffers within the carbon canister avoid that the engine intake mixture becomes too rich during engine start-up.

A carbon canister of the above-referred kind with a purge buffer is for instance disclosed in WO 2009/073323 A2. The fuel vapor recovery apparatus according to WO 2009/073323 A2 includes a transfer conduit configured to provide means for communicating a vacuum produced in an engine to the carbon bed in the interior region of a housing to cause a fuel vapor mixture laden with hydrocarbon material released from the carbon bed to be discharged from the interior region of the housing, so that the fuel vapor mixture can be burnt in the engine. This transfer conduit includes a siphon portal formed to include a fuel vapor outlet adapted to be coupled in a vapor delivery system coupled to an engine. The transfer conduite includes a bed siphon arranged to extend into the interior region of the housing and into the carbon bed and formed to include a primary air inlet located in the carbon bed to ensure that some fuel vapor admitted into the interior region of the housing through the outside airport must pass through the carbon bed before entering the bed siphon through the primary air inlet. The bed siphon of the transfer conduit extends downwardly into the carbon bed to locate the primary air inlet in the carbon bed along an imaginary partition line separating the carbon bed into an upper carbon bed and a lower carbon bed. Thus, any hydrocarbon-laden gas directly drawn from the vapor inlet port/tank port into the purge line must first flow through a portion of the carbon bed.

Due to the design of the transfer conduit, which extends into the carbon bed, always a so-called carbon dead zone is created within the carbon bed during purging. Such carbon dead zone typically leads to a loss of working capacity, since there is always a region of the carbon bed which is not fully purged. Due to the creation of such carbon dead zone, where the carbon remains saturated with hydrocarbons, the filtration path between the vapor inlet port/tank port to the atmospheric vent port will ultimately become shorter. This results in a partial loss of DBL working capacity (Diurnal Bleeding Losses Working Capacity).

Another carbon canister including a buffering activated carbon chamber which is located adjacent to a purge port of a canister and which forms a so-called purge buffer is for instance disclosed by U.S. Pat. No. 7,047,952 B1. Additionally, there is provided a partition plate between the tank port and the purge port for preventing these parts from directly communicating with each other. The carbon canister disclosed by U.S. Pat. No. 7,047,952 B1 includes a main adsorbent chamber and first and second chambers provided between the main adsorbent chamber and said purge port, one of the first and second chambers containing activated carbon, the other one of the chambers serving as an air chamber. The first and second chambers are arranged at an upstream end at the main adsorbent chamber and are in communication with each other by a passage in a buffer plate. The arrangement is such that in effect the purge buffer is arranged in a separate chamber, and the air chamber and the purge buffer are arranged side by side, such that the partition wall between the chambers also creates a carbon dead zone within the main carbon chamber.

It is thus an object of the present invention to provide a fuel vapor storage and recovery apparatus comprising a purge buffer volume, which is arranged such that the built-up of dead zones within the adsorbent material during purging is avoided or minimized as far as possible.

These and other objects are achieved by the appended claims.

According to one aspect of the present invention, there is provided a fuel vapor storage and recovery apparatus comprising at least one main vapor storage compartment filled with an adsorbent material, at least one vapor inlet port, at least one atmospheric vent port, and at least one purge port, said vapor inlet port being connectable to a fuel tank venting line and said purge port being connectable to an engine air intake line, wherein said main vapor storage compartment comprises a purge buffer zone, and first and second fuel vapor distribution chambers not filled with an adsorbent material, wherein said first fuel vapor distribution chamber is arranged upstream said purge buffer zone and communicates with said fuel vapor inlet port and wherein said second fuel vapor distribution chamber is arranged downstream said purge buffer zone and communicates with said purge port.

According to the present invention, the purge buffer zone is preferably a part of the main vapor storage compartment and this purge buffer zone is hydraulically speaking arranged between first and second vapor distribution chambers, which provides for an even gas flow through the buffer zone. Part of the main vapor storage compartment in the sense of the instant application does not exclude the separation of the buffer zone, for example by a filter mesh or the like.

The terms "upstream" and "downstream" as used herein are meant to be understood relative to the described operation of the carbon canister, i.e. venting operation or purging operation. During the purging operation normally a reverse gas flow is induced with the carbon canister from the atmospheric vent port through the carbon bed towards the purge port. During venting operation, a gas flow through the carbon canister is induced from the tank port towards the atmospheric vent port. In the initial phase of purging a kind of short-cut gas flow is induced from the tank port towards the purge port as long as the flow resistance through the fuel tank vent line is smaller than the flow resistance through the carbon bed of the carbon canister.

Although hereinafter sometimes through the adsorption material and adsorption bed is referred to as carbon bed or carbon, a person skilled in the art will appreciate that the adsorption material may be activated carbon or any other suitable adsorbent. The adsorbent may be in the form of a bed of granular material, alternatively and/or additionally, the adsorbent comprises monolithic carbon or any other monolithic adsorbent material.

In a particular preferred embodiment of the fuel vapor storage and recovery apparatus according to the instant application, said purge buffer zone is enclosed by said first fuel vapor distribution chamber. This allows for a very compact design of the fuel vapor storage and recovery apparatus with maximum exploitation of space.

According to yet another preferred embodiment of the fuel vapor storage and recovery apparatus according to the present application, said first vapor distribution chamber is defined by at least one inner partition wall enclosing and shielding said purge buffer zone, an outer wall and at least one bottom wall, the bottom wall comprising a porous structure and being in contact with the adsorbent material of said main vapor storage compartment. This allows for arrangement of the buffer zone completely upstream and separate from the vapor inlet port. Vapor entering the first fuel vapor distribution chamber will be evenly distributed over the entire upstream end portion of the main adsorbent chamber and has to first flow through a part of the upper portion of the adsorbent material in the main adsorbent chamber before the gas flows through the buffer zone. The gas flow is thereby almost evenly distributed over the entire cross section of the buffer zone.

The porous structure may be in the form of a mesh either from metal or from plastic material. According to yet another embodiment of the fuel vapor storage and recovery apparatus according to the present invention, said second vapor distribution chamber includes a bottom wall comprising a porous structure and being in contact with the adsorbent material of the purge buffer zone. The bottom wall preferably extends over the entire cross section of the purge buffer zone, thus, providing an even distribution of gas flow through the purge buffer zone.

Advantageously, the purge buffer zone forms part of the adsorbent filling of the main vapor storage compartment and said purge buffer zone is arranged at a downstream end portion of the main vapor storage compartment in a dead zone of adsorbent material during venting operation. "Dead zone" in this context means that the adsorbent material during the course of normal venting operation of the fuel vapor storage and recovery apparatus is not or almost not passed by hydrocarbon-laden gas charged from the tank port.

One particularly useful embodiment of the fuel vapor storage apparatus according to the instant application is characterized in that the adsorbent material has a stepped configuration at said end portion of said main vapor storage compartment, an elevated portion thereof forming said purge buffer zone.

Said purge buffer zone may be in the form of a buffer ring at an end face of the adsorbent filling of said main vapor storage compartment. Ring in the sense of the instant application does not mean that the purge buffer zone necessarily has to have a circular cross section.

Said purge buffer zone may be defined by an outer wall of the fourth vapor storage compartment and by said partition wall of said fuel vapor distribution chamber.

The fuel vapor storage and recovery apparatus according to the invention disclosed herein may include one or more vapor storage compartments which may be connected in series. In a preferred embodiment, the fuel vapor storage and recovery apparatus comprises at least one further or secondary vapor storage compartment, which is connected in series with said main vapor storage compartment.

In order to fulfill restricted space requirements, said main and secondary vapor storage compartments may be arranged in concentric relationship to each other. The main vapor storage compartment may include a tubular adsorbent bed or tubular configuration enclosing a tubular or cylindrical inner channel forming a further adsorbent bed connected in series with a main adsorbent bed with said main vapor storage compartment.

Two alternative preferred and advantageous embodiments are described in the following with reference to the attached drawings in which:

FIG. 1 shows a cross section of a fuel vapor storage and recovery apparatus according to a first embodiment of the invention, FIG. 2 shows a simplified enlarged cross section of the upper part of the apparatus according to FIG. 1, and FIG. 3 shows a simplified cross section of a second embodiment of the apparatus according to the invention.

A fuel vapor storage and recovery apparatus 1 according to a first embodiment of the invention is illustrated in FIG. 1. The fuel vapor storage and recovery apparatus 1 includes a generally cylindrical housing 2, which encloses a main vapor storage compartment 3 as well as further vapor storage compartments 4, 5, 6. The housing includes a vapor inlet port 7, an atmospheric vent port 8, and a purge port 9.

All vapor storage compartments 3, 4, 5, and 6 are connected in series and the main vapor storage compartment 3 surrounds the second and third vapor storage compartment 4 and 5, i.e. the main vapor storage compartment 3 and the second and third vapor storage compartment 4 and 5 are arranged in concentric relationship to each other. The main vapor storage compartment 3 as well as the second and forth vapor storage compartments 4 and 6 are filled/packed with granular activated coal as an adsorbent. The third vapor storage compartment 5 may be filled with a monolithic adsorbent material such as monolithic carbon. Additionally and/or alternatively, the third vapor storage compartment can include one or more purge heaters, or an heat exchanger.

During normal venting operation of the fuel vapor storage and recovery apparatus 1 according to the invention, fuel vapor from a tank line connected to the vapor inlet port 7 will be directed into a first fuel vapor distribution chamber 10, which has in the described preferred embodiment an annular shape and extends along the upstream end face of the main fuel vapor storage compartment 3. The first fuel vapor distribution chamber 10 is not filled or packed with any adsorbent material, i.e. is basically empty and communicates via porous structure 11 (filter mesh) with the main vapor storage compartment 3. The first fuel vapor distribution chamber comprises an outer wall 12, which forms the outer wall of the housing mold and an inner partition wall 13, which shields or seals a purge buffer zone 14 against the fuel vapor distribution chamber 10. Said purge buffer zone 14 surrounds said third vapor storage compartment 6.

It should be noted that instead of second and third and forth vapor storage compartments 4, 5, and 6 only one secondary or second vapor storage compartment could be present, which not necessarily has to be arranged in concentric relationship to the main vapor storage compartment 3, as this is the case with the embodiment according to FIG. 3.

As mentioned before, in the course of the normal venting operation, the hydrocarbon-laden gas is evenly distributed over the upstream face of the main vapor storage compartment 3 and will be passed through the main vapor storage compartment 3 into an air chamber 15 at the downstream end of the main vapor storage compartment 3.

This air chamber 15 is provided between a closure cap 16 of the housing 2 and a bottom mesh 17 or bottom grid at the "downstream end" of the main vapor storage compartment 3. "Downstream" in this regard refers to the normal venting operation of the fuel vapor storage and recovery apparatus 1.

The second, third and forth vapor storage compartments 4, 5, and 6 are defined by tubular inserts 18, 19, which extend within housing 2 and are surrounded by the main vapor storage compartment 3. The tubular insert 18 includes cylindrical dividers 20, which cooperate with cylindrical dividers 20a of the closure cap 16. More specifically, the cylindrical dividers 20a of the closure cap 16 extend into gaps between the dividers 20 of the tubular insert 18, so as to form an extended winding air flow path, the length of which is determined by the amount of dividers 20 and 20a. In this air flow path 21, the wholly or partially cleaned gas exiting the downstream end of the first vapor storage compartment is deviated several times in a 180° direction until it enters the second vapor storage compartment 4. The third vapor storage compartment 5 includes a cup-shaped insert 22, which also defines an extended winding air flow path or air flow gap 23, where the air flow is again deviated several times in a 180° direction until it enters the fourth vapor storage compartment 6.

Finally, at the very downstream end of the gas flow gap 23, there is provided a forth vapor storage compartment 6, which is also packed with adsorbent material.

In the following, the purging function of the fuel vapor storage and recovery apparatus 1 will be described in more detail.

As mentioned in the very beginning, the housing 2 includes a purge port 9, which communicates with a second fuel vapor distribution chamber 24. The second fuel vapor distribution chamber 24 is also formed as an annular chamber, which is defined by an outer wall 25, an inner wall 26, and a bottom wall 27, which also includes a porous structure 28. The bottom wall 27 at the same time defines an upstream face of the purge buffer zone 14.

In the embodiment according to FIG. 1, the purge buffer zone 14 is not separated from the adsorbent filling of the main vapor storage compartment 3. A person skilled in the art will however appreciate that the purge buffer zone 14 may be separated by a porous member.

The bottom wall 27 of the second fuel vapor distribution chamber 24 completely covers the downstream face of the purge buffer zone 14.

In the course of a purging operation, suction will be applied to the purge port 9 via an engine air intake line. This suction will be evenly applied to the entire cross section of the purge buffer zone 14 via second vapor distribution chamber 24. This causes in first instance a pressure drop at the vapor inlet port 7, so that at the very beginning of the purging operation fuel vapor will be drawn from the tank line via vapor inlet port into the first vapor distribution chamber 10. Of course, the fuel vapor initially tends to take the shortest way from the fuel vapor inlet port 7 to the purge port 7, however, is hindered by the partition wall 13, so that the fuel vapor has to pass the porous structure 11 and to enter into the main vapor storage compartment 3. From this upstream end of the main vapor storage compartment 3, the fuel-laden gas will enter the purge buffer zone 14 from below and thereby will be distributed evenly over the entire cross section of the purge buffer zone 14. From the purge buffer zone 14, the gas will then enter into the second fuel vapor distribution chamber 24, which completely extends over and communicates with the downstream face of the fuel buffer zone 14, so that the gas will be evenly distributed over the entire cross section of purge buffer zone 14.

As this may be seen more readily from FIG. 2, the main vapor storage compartment has a kind of stepped configuration and the purge buffer zone 14 forms part of the main vapor storage compartment 3. In the configuration shown in FIG. 2, there is basically no separation between the purge buffer zone 14 and the main vapor storage compartment 3. The purge buffer zone 14 is in the form of an elevated ring on the end face/upstream face of the main vapor storage compartment 3 and surrounds tubular insert 19, which also receives adsorbent material either in the form of a granular carbon bed or in the form of a monolithic carbon or other monolithic adsorbent material.

A second embodiment of the fuel vapor storage and recovery apparatus 1 according to the instant application is shown in FIG. 3. Same reference numerals denote same parts.

As with the first embodiment, the main vapor storage compartment 3 has an integrated purge buffer zone 14, which is arranged upstream the fuel vapor inlet port 7, i.e. upstream the open/porous end face of the main vapor storage compartment 3 communicating with the fuel vapor inlet port 7. The open surface of the purge buffer zone 14 towards the purge port 9 is upstream relative to the open surface of the main vapor storage compartment 3 towards the fuel vapor inlet port 7 with the effect, that the adsorption volume in the purge buffer zone is during normal venting operation of the fuel vapor storage apparatus 1 in a dead zone and basically remains less charged with hydrocarbons (fuel vapor) during the venting operation. During the purging operation, the purge air flow converges into the center of the purge buffer zone 14, initially conveying a reduced concentration of hydrocarbons to the engine and then acting as a buffer zone through which higher concentrations from the main vapour storage compartment 3 must pass.

Opposed to the embodiment according to FIG. 1, the first and main vapor storage compartment 3 is connected in series with a second vapor storage compartment 4, which are generally arranged side by side as opposed to a concentrical arrangement according to the embodiment of FIG. 1. Accordingly, the purge buffer zone 14 has not a ring-shaped design, but rather a disc-shaped design. The terms "ring-shaped" and "disc-shaped" are not meant to limit the invention to circular and rotational symmetrically designs. The purge buffer zone 14 can have any cross section including rectangular or square or oval or elliptic.

As with the first embodiment, in the course of normal venting operation, hydrocarbon-laden gas enters the vapor inlet port 7 from a fuel tank, which is not shown. The vapor inlet port 7 communicates with the first fuel vapor distribution chamber 10, which is separated from the purge buffer zone 14 by the partition wall 13. The bottom wall of the first fuel vapor distribution chamber comprises a porous structure 11, which forms the open front face of the main vapor storage compartment 3 towards the vapor inlet port 7. The gas passes the main vapor storage compartment 3 and enters the air chamber 15 connecting the main vapor storage compartment 3 and the second vapor storage compartment 4. The gas then passes the second vapor storage compartment 4 towards the atmospheric vent port 8 into the atmosphere.

REFERENCE NUMERALS 1 fuel vapor storage and recovery apparatus
2 housing
3 main vapor storage compartment
4, 5, 6 second, third, and forth vapor storage compartments
7 vapor inlet port
8 atmospheric vent port
9 purge port
10 first fuel vapor distribution chamber
11 porous structure
12 outer wall
13 partition wall
14 purge buffer zone
15 air chamber
16 closure cap
17 bottom mesh/bottom grid
18, 19 tubular inserts
20 dividers
20a dividers
21 air flow path
22 cup-shaped insert
23 airflow gap
24 second fuel vapor distribution chamber
25 outer wall
26 inner wall
27 bottom wall
28 porous structure

What is claimed is:

1. A fuel vapor storage and recovery apparatus comprising:
    at least one main vapor storage compartment filled with an adsorbent material,
    at least one vapor inlet port,
    at least one atmospheric vent port and at least one purge port, said vapor inlet port being connectable to a fuel tank venting line and said purge port being connectable to an engine air intake line,
    wherein said main vapor storage compartment comprises a purge buffer zone and first and second fuel vapor distribution chambers not filled with an adsorbent material,
    wherein said first fuel vapor distribution chamber is arranged upstream said purge buffer zone and communicates with said fuel vapor inlet port,
    wherein said second fuel vapor distribution chamber is arranged downstream said purge buffer zone and communicates with said purge port,
    wherein said purge buffer zone is enclosed by said first fuel vapor distribution chamber, and
    wherein said purge buffer zone is hydraulically arranged between said first and second fuel vapor distribution chambers.

2. The fuel vapor storage and recovery apparatus according to claim 1, wherein said first fuel vapor distribution chamber has an annular shape and said purge buffer zone is enclosed by said annular shape of said first fuel vapor distribution chamber.

3. The fuel vapor storage and recovery apparatus according to claim 1, wherein said first fuel vapor distribution chamber is defined by at least one inner partition wall enclosing and shielding said purge buffer zone, an outer wall and at least one bottom wall, the bottom wall comprising a porous structure and being in contact with the adsorbent material of said main vapor storage compartment.

4. The fuel vapor storage and recovery apparatus according to claim 1, wherein said second vapor distribution chamber includes a bottom wall comprising a porous structure and being in contact with the adsorbent material of the purge buffer zone.

5. The fuel vapor storage and recovery apparatus according to claim 1, wherein the purge buffer zone forms part of the adsorbent filling of the main vapor storage compartment and in that said purge buffer zone is arranged at a downstream end portion of the main vapor storage compartment in a dead zone of adsorbent material during venting operation.

6. The fuel vapor storage and recovery apparatus according to claim 1, wherein the adsorbent material has a stepped configuration at said end portion of said main vapor storage compartment, an elevated portion thereof forming said purge buffer zone.

7. The fuel vapor storage and recovery apparatus according to claim 1, wherein said purge buffer zone is in the form of a buffer ring or in the form of buffer projection on an end face of the adsorbent filling of said main vapor storage compartment.

8. The fuel vapor storage and recovery apparatus according to claim 1, wherein said purge buffer zone is defined by an outer wall of a further vapor storage compartment and by said partition wall of said first fuel vapor distribution chamber.

9. The fuel vapor storage and recovery apparatus of claim 8, wherein said further vapor storage compartment is connected in series with said first vapor storage compartment.

10. Fuel The fuel vapor storage and recovery apparatus according to claim 8, wherein said first and further vapor storage compartments are arranged in concentric relationship to each other.

* * * * *

UNITED STATES PATENT AND TRADEMARK OFFICE
CERTIFICATE OF CORRECTION

| | | |
|---|---|---|
| PATENT NO. | : 9,534,566 B2 | Page 1 of 1 |
| APPLICATION NO. | : 14/417377 | |
| DATED | : January 3, 2017 | |
| INVENTOR(S) | : Danielowski et al. | |

It is certified that error appears in the above-identified patent and that said Letters Patent is hereby corrected as shown below:

On the Title Page

Column 1, Inventors item (72), delete "Southhampton" and insert -- Southampton --, therefor.

In the Claims

In Column 8, Line 58, in Claim 10, delete "Fuel The" and insert -- The --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*